United States Patent
Putnam et al.

(10) Patent No.: US 11,468,085 B2
(45) Date of Patent: Oct. 11, 2022

(54) BROWSER-BASED AGGREGATION

(71) Applicant: Plaid Inc., San Francisco, CA (US)

(72) Inventors: Warren Lowell Putnam, New York, NY (US); Michael George Del Monte, Garrison, NY (US)

(73) Assignee: Plaid Inc., San Francisco, CA (US)

( * ) Notice: Subject to any disclaimer, the term of this patent is extended or adjusted under 35 U.S.C. 154(b) by 0 days.

(21) Appl. No.: 16/042,147

(22) Filed: Jul. 23, 2018

(65) Prior Publication Data
US 2020/0201878 A1 Jun. 25, 2020

Related U.S. Application Data

(60) Provisional application No. 62/535,859, filed on Jul. 22, 2017.

(51) Int. Cl.
| | |
|---|---|
| *G06F 16/27* | (2019.01) |
| *G06Q 40/02* | (2012.01) |
| *G06Q 50/26* | (2012.01) |
| *H04L 67/141* | (2022.01) |
| *G06F 16/2455* | (2019.01) |
| *G06F 21/62* | (2013.01) |
| *G06F 16/955* | (2019.01) |

(52) U.S. Cl.
CPC ........ *G06F 16/27* (2019.01); *G06F 16/24556* (2019.01); *G06F 16/955* (2019.01); *G06F 21/6245* (2013.01); *G06Q 40/02* (2013.01); *G06Q 50/265* (2013.01); *H04L 67/141* (2013.01)

(58) Field of Classification Search
CPC .. G06F 16/27; G06F 16/955; G06F 16/24556; G06F 21/6245; G06Q 40/02; G06Q 50/265; H04L 67/141

USPC .......................................................... 707/620
See application file for complete search history.

(56) References Cited

U.S. PATENT DOCUMENTS

| | | | |
|---|---|---|---|
| 5,237,499 | A | 8/1993 | Garback |
| 5,347,632 | A | 9/1994 | Filepp |
| 5,634,127 | A | 5/1997 | Cloud |

(Continued)

FOREIGN PATENT DOCUMENTS

| | | |
|---|---|---|
| EP | 0 848 336 | 6/1998 |
| EP | 0 848 338 | 6/1998 |

(Continued)

OTHER PUBLICATIONS

"WebEntree: A Web Service Aggregator", Y. Zhao, IBM Systems Journal, vol. 37, No. 4, 1998. (Year: 1998).*

(Continued)

*Primary Examiner* — Allen S Lin
(74) *Attorney, Agent, or Firm* — Knobbe, Martens, Olson & Bear, LLP

(57) ABSTRACT

A system and method for aggregating account data, and more specifically, a system and method for aggregation of financial account data that provides enhanced privacy and security protections to a user by enabling the user to maintain custody of his or her login credentials. A syncing agent in coordination with a system add-on coordinates log-in to a remote system and storage of session information. Syncing agent utilizes the session agent to retrieve additional information on behalf of the user or perform other tasks on the remote server.

6 Claims, 4 Drawing Sheets

(56) References Cited

U.S. PATENT DOCUMENTS

| | | |
|---|---|---|
| 5,649,186 A | 7/1997 | Ferguson |
| 5,701,451 A | 12/1997 | Rogers |
| 5,710,884 A | 1/1998 | Dedrick |
| 5,710,918 A | 1/1998 | Lagarde |
| 5,721,908 A | 2/1998 | Lagarde |
| 5,727,159 A | 3/1998 | Kikinis |
| 5,745,754 A | 4/1998 | Lagarde |
| 5,752,246 A | 5/1998 | Rogers |
| 5,778,065 A | 7/1998 | Hauser et al. |
| 5,778,367 A | 7/1998 | Wesinger, Jr. et al. |
| 5,787,403 A | 7/1998 | Randle |
| 5,793,964 A | 8/1998 | Rogers |
| 5,813,007 A | 9/1998 | Nielsen |
| 5,815,665 A | 9/1998 | Teper |
| 5,819,284 A | 10/1998 | Farber |
| 5,835,724 A | 11/1998 | Smith |
| 5,838,910 A | 11/1998 | Domenikos et al. |
| 5,838,916 A | 11/1998 | Domenikos et al. |
| 5,845,073 A | 12/1998 | Carlin |
| 5,855,018 A | 12/1998 | Chor et al. |
| 5,862,325 A | 1/1999 | Reed et al. |
| 5,870,559 A | 2/1999 | Leshem et al. |
| 5,875,296 A | 2/1999 | Shi |
| 5,878,219 A | 3/1999 | Vance |
| 5,892,905 A | 4/1999 | Brandt et al. |
| 5,892,909 A | 4/1999 | Grasso |
| 5,898,836 A | 4/1999 | Freivald |
| 5,901,287 A | 5/1999 | Bull |
| 5,903,881 A | 5/1999 | Schrader |
| 5,908,469 A | 6/1999 | Botz |
| 5,913,214 A | 6/1999 | Madnick |
| 5,918,216 A | 6/1999 | Miksovsky et al. |
| 5,920,848 A | 7/1999 | Schutzer |
| 5,926,798 A | 7/1999 | Carter |
| 5,930,764 A | 7/1999 | Melchione et al. |
| 5,930,777 A | 7/1999 | Barber |
| 5,933,604 A | 8/1999 | Inakoshi |
| 5,933,816 A | 8/1999 | Zeanah |
| 5,956,720 A | 9/1999 | Fernandez et al. |
| 5,961,593 A | 10/1999 | Gabber et al. |
| 5,961,601 A | 10/1999 | Iyengar |
| 5,963,915 A | 10/1999 | Kirsch |
| 5,963,925 A | 10/1999 | Kolling |
| 5,966,967 A | 10/1999 | Agrawal |
| 5,978,828 A | 11/1999 | Greer |
| 5,978,842 A | 11/1999 | Noble |
| 5,983,267 A | 11/1999 | Shklar et al. |
| 5,983,268 A | 11/1999 | Freivald |
| 5,987,440 A | 11/1999 | O'Neil |
| 5,987,454 A | 11/1999 | Hobbs |
| 5,995,943 A | 11/1999 | Bull |
| 5,999,971 A | 12/1999 | Buckland |
| 6,003,032 A | 12/1999 | Bunney et al. |
| 6,006,333 A | 12/1999 | Nielsen |
| 6,023,698 A | 2/2000 | Lavey |
| 6,041,362 A | 3/2000 | Mears et al. |
| 6,047,327 A | 4/2000 | Tso et al. |
| 6,055,570 A | 4/2000 | Nielsen |
| 6,078,929 A | 6/2000 | Rao |
| 6,082,776 A | 7/2000 | Feinberg |
| 6,092,196 A | 7/2000 | Reiche |
| 6,092,197 A | 7/2000 | Coueignoux |
| 6,105,131 A | 8/2000 | Carroll |
| 6,119,101 A | 9/2000 | Peckover |
| 6,138,158 A | 10/2000 | Boyle |
| 6,148,337 A | 11/2000 | Estberg et al. |
| 6,151,581 A | 11/2000 | Kraftson et al. |
| 6,151,601 A | 11/2000 | Papierniak |
| 6,182,142 B1 | 1/2001 | Win |
| 6,185,567 B1 | 2/2001 | Ratnaraj et al. |
| 6,195,698 B1 | 2/2001 | Lillibridge et al. |
| 6,199,077 B1 | 3/2001 | Inala |
| 6,205,433 B1 | 3/2001 | Boesch |
| 6,208,975 B1 | 3/2001 | Bull |
| 6,209,007 B1 | 3/2001 | Kelley et al. |
| 6,243,816 B1 | 6/2001 | Fang et al. |
| 6,246,999 B1 | 6/2001 | Riley et al. |
| 6,278,449 B1 | 8/2001 | Sugiarto et al. |
| 6,278,999 B1 | 8/2001 | Knapp |
| 6,292,789 B1 | 9/2001 | Schutzer |
| 6,297,819 B1 | 10/2001 | Furst |
| 6,301,584 B1 | 10/2001 | Ranger |
| 6,308,203 B1 | 10/2001 | Itabashi et al. |
| 6,311,275 B1 | 10/2001 | Jin et al. |
| 6,317,783 B1 | 11/2001 | Freishtat |
| 6,360,205 B1 | 3/2002 | Iyengar |
| 6,366,933 B1 | 4/2002 | Ball et al. |
| 6,401,118 B1 | 6/2002 | Thomas |
| 6,405,245 B1 | 6/2002 | Burson |
| 6,412,073 B1 | 6/2002 | Rangan |
| 6,424,968 B1 | 7/2002 | Broster |
| 6,430,539 B1 | 8/2002 | Lazarus |
| 6,484,155 B1 | 11/2002 | Kiss |
| 6,499,042 B1 | 12/2002 | Markus |
| 6,510,451 B2 | 1/2003 | Wu |
| 6,567,411 B2 | 5/2003 | Dahlen |
| 6,567,850 B1 | 5/2003 | Freishtat |
| 6,594,766 B2 | 7/2003 | Rangan |
| 6,632,248 B1 | 10/2003 | Isaac et al. |
| 6,633,910 B1 | 10/2003 | Rajan |
| 6,631,402 B1 | 11/2003 | Devine |
| 6,725,200 B1 | 4/2004 | Rost |
| 6,802,042 B2 | 10/2004 | Rangan |
| 6,859,931 B1 | 2/2005 | Cheyer et al. |
| 6,957,199 B1 | 10/2005 | Fisher |
| 7,028,049 B1 | 4/2006 | Shelton |
| 7,072,932 B1 | 7/2006 | Stahl |
| 7,092,913 B2 | 8/2006 | Cannon, Jr. |
| 7,200,578 B2 | 4/2007 | Paltenghe et al. |
| 7,263,548 B2 | 8/2007 | Daswani |
| 7,275,046 B1 | 9/2007 | Tritt et al. |
| 7,340,411 B2 | 3/2008 | Cook |
| 7,370,011 B2 | 5/2008 | Bennett et al. |
| 7,424,520 B2 | 9/2008 | Daswani |
| 7,640,210 B2 | 12/2009 | Bennett et al. |
| 7,752,535 B2 | 7/2010 | Satyavolu |
| 8,006,291 B2 | 8/2011 | Headley et al. |
| 8,010,783 B1 | 8/2011 | Cahill |
| 8,086,508 B2 | 12/2011 | Dheer et al. |
| 8,140,431 B1 | 3/2012 | Murphy |
| 8,145,914 B2 | 3/2012 | Steeves |
| 8,166,562 B2 | 4/2012 | Holvey et al. |
| 8,209,194 B1 | 6/2012 | Nidy et al. |
| 8,266,515 B2 | 9/2012 | Satyavolu |
| 8,613,066 B1 | 12/2013 | Brezinski et al. |
| 8,645,264 B2 | 2/2014 | Allison et al. |
| 8,676,611 B2 | 3/2014 | McLaughlin et al. |
| 8,739,260 B1 | 5/2014 | Damm-Goossens |
| 8,788,416 B1 | 7/2014 | Vu |
| 8,995,967 B1 * | 3/2015 | Billman .......... H04W 4/16 455/414.1 |
| 9,106,642 B1 | 8/2015 | Bhimanail |
| 9,202,250 B1 | 12/2015 | Palaniappan |
| 9,430,892 B2 | 8/2016 | Amdahl |
| 9,449,346 B1 | 9/2016 | Hockey |
| 9,595,023 B1 | 3/2017 | Hockey et al. |
| 9,699,187 B2 | 7/2017 | Chen et al. |
| 9,774,590 B2 | 9/2017 | Bronshtein et al. |
| 9,906,520 B2 | 2/2018 | Fouad et al. |
| 10,003,591 B2 | 6/2018 | Hockey et al. |
| 10,104,059 B2 | 10/2018 | Hockey et al. |
| 10,319,029 B1 | 6/2019 | Hockey et al. |
| 10,523,653 B2 | 12/2019 | Hockey et al. |
| 10,530,761 B2 | 1/2020 | Hockey et al. |
| 10,546,348 B1 | 1/2020 | Lesner et al. |
| 10,614,463 B1 | 4/2020 | Hockey et al. |
| 10,726,491 B1 | 7/2020 | Hockey et al. |
| 10,878,421 B2 | 12/2020 | Putnam |
| 10,904,239 B2 | 1/2021 | Hockey et al. |
| 10,984,468 B1 | 4/2021 | Hockey et al. |
| 11,030,682 B1 | 6/2021 | Hockey et al. |
| 11,050,729 B2 | 6/2021 | Hockey et al. |
| 11,216,814 B1 | 1/2022 | Hockey et al. |
| 2001/0011274 A1 | 8/2001 | Klug et al. |

(56) References Cited

U.S. PATENT DOCUMENTS

| | | |
|---|---|---|
| 2002/0002596 A1 | 1/2002 | Sugiarto et al. |
| 2002/0065772 A1 | 5/2002 | Saliba et al. |
| 2002/0091635 A1 | 7/2002 | Dilip et al. |
| 2002/0095588 A1 | 7/2002 | Shigematsu et al. |
| 2003/0023879 A1 | 1/2003 | Wray |
| 2003/0028646 A1 | 2/2003 | Wray |
| 2003/0060896 A9 | 3/2003 | Hulai |
| 2003/0158960 A1 | 8/2003 | Engberg |
| 2003/0163425 A1 | 8/2003 | Cannon, Jr. |
| 2003/0182035 A1 | 9/2003 | DiLodovico et al. |
| 2003/0185370 A1 | 10/2003 | Rosera e tal. |
| 2003/0204460 A1 | 10/2003 | Robinson |
| 2004/0059672 A1 | 3/2004 | Baig et al. |
| 2005/0027617 A1 | 2/2005 | Zucker et al. |
| 2005/0154913 A1 | 7/2005 | Barriga et al. |
| 2005/0177510 A1 | 8/2005 | Hilt et al. |
| 2005/0222929 A1 | 10/2005 | Steier et al. |
| 2005/0246269 A1 | 11/2005 | Smith |
| 2006/0015358 A1 | 1/2006 | Chua |
| 2006/0116949 A1 | 6/2006 | Wehunt et al. |
| 2006/0136332 A1 | 6/2006 | Ziegler |
| 2006/0190569 A1 | 8/2006 | Neil |
| 2006/0236384 A1 | 10/2006 | Lindholm et al. |
| 2007/0179883 A1 | 8/2007 | Questembert |
| 2007/0179942 A1 | 8/2007 | Heggem |
| 2007/0225047 A1* | 9/2007 | Bakos ............... H04M 1/7253 455/566 |
| 2007/0255662 A1 | 11/2007 | Tumminaro |
| 2007/0289002 A1 | 12/2007 | van der Horst et al. |
| 2008/0051059 A1 | 2/2008 | Fisher |
| 2008/0052192 A1 | 2/2008 | Fisher |
| 2008/0052233 A1 | 2/2008 | Fisher |
| 2008/0120129 A1 | 5/2008 | Seubert et al. |
| 2008/0162361 A1 | 7/2008 | Sklovsky |
| 2008/0183628 A1 | 7/2008 | Oliver et al. |
| 2008/0243784 A1 | 10/2008 | Stading |
| 2008/0249931 A1 | 10/2008 | Gilder et al. |
| 2008/0250246 A1 | 10/2008 | Arditti et al. |
| 2009/0037308 A1 | 2/2009 | Feinstein |
| 2009/0070257 A1 | 3/2009 | Csoka |
| 2009/0222900 A1 | 9/2009 | Benaloh et al. |
| 2009/0228779 A1 | 9/2009 | Williamson et al. |
| 2009/0245521 A1 | 10/2009 | Vembu |
| 2009/0271847 A1 | 10/2009 | Karjala et al. |
| 2009/0328177 A1 | 12/2009 | Frey et al. |
| 2010/0027552 A1 | 2/2010 | Hill |
| 2010/0043054 A1 | 2/2010 | Kidwell |
| 2010/0049850 A1 | 2/2010 | Nanduri et al. |
| 2010/0169072 A1 | 7/2010 | Zaki et al. |
| 2010/0185868 A1 | 7/2010 | Grecia |
| 2010/0235882 A1 | 9/2010 | Moore |
| 2010/0313255 A1* | 12/2010 | Khuda ................ G06F 9/454 726/7 |
| 2010/0325710 A1 | 12/2010 | Etchegoyen |
| 2011/0196790 A1 | 8/2011 | Milne |
| 2011/0238550 A1 | 9/2011 | Reich et al. |
| 2011/0247060 A1* | 10/2011 | Whitmyer, Jr. ......... G06F 21/34 726/6 |
| 2011/0295731 A1 | 12/2011 | Waldron, III et al. |
| 2012/0059706 A1 | 3/2012 | Goenka et al. |
| 2012/0129503 A1 | 5/2012 | Lindeman et al. |
| 2012/0209775 A1 | 8/2012 | Milne |
| 2012/0215688 A1 | 8/2012 | Musser et al. |
| 2012/0278201 A1 | 11/2012 | Milne |
| 2012/0281058 A1* | 11/2012 | Laney .................. H04N 7/147 348/14.03 |
| 2012/0284175 A1 | 11/2012 | Wilson et al. |
| 2012/0323717 A1 | 12/2012 | Kirsch |
| 2013/0019297 A1 | 1/2013 | Lawson et al. |
| 2013/0041736 A1 | 2/2013 | Coppinger |
| 2013/0041739 A1 | 2/2013 | Coppinger |
| 2013/0041744 A1 | 2/2013 | Coppinger |
| 2013/0046599 A1 | 2/2013 | Coppinger |
| 2013/0097685 A1* | 4/2013 | Kennedy ............ G06F 16/9577 726/8 |
| 2013/0125223 A1 | 5/2013 | Sorotokin et al. |
| 2013/0174015 A1 | 7/2013 | Jeff |
| 2013/0191526 A1 | 7/2013 | Zhao |
| 2013/0232006 A1 | 9/2013 | Holcomb et al. |
| 2013/0247005 A1 | 9/2013 | Hirsch et al. |
| 2013/0282577 A1 | 10/2013 | Milne |
| 2013/0318592 A1 | 11/2013 | Grier, Sr. et al. |
| 2014/0032414 A1 | 1/2014 | Beisner et al. |
| 2014/0040148 A1 | 2/2014 | Ozvat et al. |
| 2014/0044123 A1 | 2/2014 | Lawson et al. |
| 2014/0067499 A1 | 3/2014 | Stepanovich |
| 2014/0150072 A1 | 5/2014 | Castro et al. |
| 2014/0165156 A1 | 6/2014 | Fushman et al. |
| 2014/0173695 A1 | 6/2014 | Valdivia |
| 2014/0180962 A1 | 6/2014 | Fiala et al. |
| 2014/0189808 A1 | 7/2014 | Mahaffey et al. |
| 2014/0189828 A1 | 7/2014 | Baghdasaryan et al. |
| 2014/0208389 A1 | 7/2014 | Kelley |
| 2014/0215551 A1 | 7/2014 | Allain et al. |
| 2014/0236716 A1* | 8/2014 | Shapiro ............ G06Q 30/0255 705/14.53 |
| 2014/0245411 A1 | 8/2014 | Meng et al. |
| 2014/0258063 A1 | 9/2014 | Chourasia et al. |
| 2014/0280555 A1 | 9/2014 | Tapia et al. |
| 2014/0344141 A1 | 11/2014 | Cook |
| 2014/0358704 A1 | 12/2014 | Banerjee et al. |
| 2014/0365350 A1 | 12/2014 | Shvarts |
| 2015/0026024 A1 | 1/2015 | Caiman et al. |
| 2015/0046338 A1 | 2/2015 | Laxminarayanan et al. |
| 2015/0066719 A1 | 3/2015 | Agrawal et al. |
| 2015/0066765 A1 | 3/2015 | Banks et al. |
| 2015/0088707 A1 | 3/2015 | Drury et al. |
| 2015/0088732 A1 | 3/2015 | DeVan, Jr. et al. |
| 2015/0113511 A1 | 4/2015 | Poulin |
| 2015/0161608 A1 | 6/2015 | Gilbert |
| 2015/0193871 A1 | 7/2015 | Murphy |
| 2015/0254672 A1 | 9/2015 | Huesch et al. |
| 2015/0281225 A1 | 10/2015 | Schoen et al. |
| 2015/0310562 A1 | 10/2015 | Chourasia et al. |
| 2015/0339664 A1 | 11/2015 | Wong et al. |
| 2015/0365399 A1 | 12/2015 | Biswas et al. |
| 2016/0063657 A1 | 3/2016 | Chen et al. |
| 2017/0118301 A1 | 4/2017 | Kouru et al. |
| 2017/0132633 A1 | 5/2017 | Whitehouse |
| 2017/0148021 A1 | 5/2017 | Goldstein et al. |
| 2017/0193112 A1* | 7/2017 | Desineni ............... G06F 16/345 |
| 2017/0193486 A1 | 7/2017 | Parekh |
| 2017/0200137 A1 | 7/2017 | Vilmont |
| 2017/0200234 A1 | 7/2017 | Morse |
| 2017/0262840 A1 | 9/2017 | Dunwoody |
| 2017/0300960 A1 | 10/2017 | Khvostov et al. |
| 2017/0308902 A1 | 10/2017 | Quiroga et al. |
| 2018/0060927 A1 | 3/2018 | Gupta |
| 2018/0157851 A1 | 6/2018 | Sgambati et al. |
| 2018/0191685 A1 | 7/2018 | Bajoria |
| 2018/0196694 A1 | 7/2018 | Banerjee et al. |
| 2018/0232734 A1 | 8/2018 | Smets et al. |
| 2018/0246943 A1 | 8/2018 | Avagyan et al. |
| 2018/0267847 A1 | 9/2018 | Keremane et al. |
| 2018/0267874 A1 | 9/2018 | Keremane et al. |
| 2018/0330342 A1 | 11/2018 | Prakash et al. |
| 2018/0349909 A1 | 12/2018 | Allen et al. |
| 2018/0367428 A1* | 12/2018 | Di Pietro ............... G06N 20/10 |
| 2019/0075115 A1 | 3/2019 | Anderson et al. |
| 2019/0180364 A1 | 6/2019 | Chong et al. |
| 2019/0188717 A1 | 6/2019 | Putnam |
| 2019/0333159 A1 | 10/2019 | Chourasia et al. |
| 2019/0354544 A1 | 11/2019 | Hertz et al. |
| 2020/0106764 A1 | 4/2020 | Hockey et al. |
| 2020/0106765 A1 | 4/2020 | Hockey et al. |
| 2020/0110585 A1 | 4/2020 | Perry |
| 2021/0004439 A1 | 1/2021 | Xiong et al. |
| 2021/0165960 A1 | 6/2021 | Eisenschlos et al. |
| 2021/0217016 A1 | 7/2021 | Putman |
| 2021/0233162 A1 | 7/2021 | Hockey et al. |

(56) References Cited

U.S. PATENT DOCUMENTS

| | | |
|---|---|---|
| 2021/0281558 A1 | 9/2021 | Hockey et al. |
| 2021/0288956 A1 | 9/2021 | Hockey et al. |
| 2021/0350340 A1 | 11/2021 | Lai et al. |

FOREIGN PATENT DOCUMENTS

| | | |
|---|---|---|
| EP | 0 848 339 | 6/1998 |
| EP | 2 747 374 | 6/2014 |
| EP | 3 347 846 | 7/2018 |
| WO | WO 96/38795 | 12/1996 |
| WO | WO 97/10542 | 3/1997 |
| WO | WO 97/09682 | 5/1997 |
| WO | WO 97/26612 | 7/1997 |
| WO | WO 97/37314 | 10/1997 |
| WO | WO 98/14896 | 4/1998 |
| WO | WO 00/25227 | 5/2000 |
| WO | WO 2017/044479 | 3/2017 |
| WO | WO 2017/173021 | 10/2017 |

OTHER PUBLICATIONS

"A Single Login Web Service Integrator—WebEntrance", Yan Zhao, Sixth International World Wide Web Conference, Santa Clara, CA, Apr. 7-11, 1997.

"Automatic Notification of Web Sites Changes," Google Groups, Aug. 30, 1995.

"Boeing Chooses NetMind Enterprise Minder to Help Thousands of Employees Track Web-Based Information," PR Newswire, Nov. 19, 1998.

"Caravelle's InfoWatcher 1.1 Keeps an Eye on the Web," PC Week 1997.

"Cognisoft Announces IntelliServ, A Revolutionary Intranet Information Management Application; a Powerful Solution that Enables the Right Information to Find the Right User at the Right Time," Business Wire, p. 8140125, Aug. 14, 1996.

"FirstFloor and AirMedia Announce Partnership," Business Wire 1997 ("FirstFloor").

"Fujitsu Announces 'WebAgent' Application as part of ByeDesk Link Wireless Server Software," Business Wire, Sep. 1, 1998.

"Fujitsu Announces Availability of ByeDesk Link for Alpha-Numeric Pagers; Next Step in Empowering Mobile Workforces with 'Anyplace, Anytime' Information," Business Wire, Jul. 9, 1998.

"Fujitsu Picks NetMind for Wireless Web Agent Software," Computergram International, Sep. 2, 1998.

"Fujitsu's ByeDesk Link Now Available On the PalmPilot," Business Wire, Sep. 21, 1998.

"GC Tech's GlobeID Payment Internet Commerce Software Supports Microsoft, Merchant Server," Business Wire, Jan. 21, 1997, p. 1211286.

"Highly Scalable On-Line Payments via Task Decoupling," Financial Cryptography First International Conference, 1998, p. 355-373.

"Minding Web Site Changes," PC Week, Sep. 14, 1998.

"NetMind Accepts $7 Million Strategic Investment From Three Prominent VC Firms—BancBoston, SOFTBANK and Draper Fisher Jurvestson," PR Newswire, Nov. 6, 1998.

"NetMind Updates the World's Largest Free Web Tracking Service," PR Newswire, Sep. 18, 1998.

"The AT&T Internet Difference Engine: Tracking and Viewing Changes on the Web," World Wide Web 1(1); Jan. 1998, pp. 27-44.

"Versatile Intelligent Agents in Commercial Applications," Google Groups, Dec. 12, 1998.

"Web Interface Definition Language (WIDL)", W3 Consortium submission from webMethods, Inc., Sep. 22, 1997.

"WebEntree: A Web Service Aggregator", Y. Zhao, IBM Systems Journal, vol. 37, No. 4, 1998.

A hierarchical approach to wrapper induction, Ion Muslea, Steve Minton, and Craig A. Knoblock. In Proceedings of the 3rd International Conference on Autonomous Agents 1999, Seattle, WA, 1999. May 1-5, 1999.

Building agents for internet-base supply chain integration, Craig A. Knoblock and Steven Minton. In Proceedings of the Workshop on Agents for Electronic Commerce and Managing the Internet-Enabled Supply Chain, Seattle, WA, 1999. May 1-5, 1999.

Corena et al., "Secure and fast aggregation of financial data in cloud-based expense tracking applications." Journal of Network and Systems Management 20.4 (2012): 534-560.

Hagel et al. "The Coming Battle for Customer Information." Harvard Business Review, Jan.-Feb. 1997, reprint No. 97104.

Hummer, Waldemar, Philipp Leitner, and Schahram Dustdar. "Ws-aggregation: distributed of web services data." Proceedings of the 2011 ACM Symposium on Applied Computing. ACM, 2011.

Intelligent caching for information mediators: A kr based approach, Naveen Ashish, Craig A. Knoblock, and Cyrus Shahabi. In Proceedings of the Workshop on Knowledge Representation meets Databases (KRDB), Seattle, WA, 1998. Presented May 1, 1998.

Johner et al. "Sign On with IBM's Global Sign-On!" IBM manual, Nov. 1998. Part 1, in 184 pages.

Johner et al. "Sign On with IBM's Global Sign-On!" IBM manual, Nov. 1998. Part 2, pp. 166-307.

Kim, Young-Gon et al., 'A Design of User Authentication System Using QR code Identifying Method', 6th International Conference on Computer Sciences and Convergence Information Technology (ICCIT), pp. 31-35, 2011.

Kyeongwon C., et al., 'A Mobile based Anti-Phishing Authentication Scheme using QR code', IEEE International Conference on Mobile IT Convergence, pp. 109-113, 2011.

Mancini et al., "Simulation in the Cloud Using Handheld Devices," Workshop on Modeling and Simulation on Grid and Cloud Computing, Apr. 25, 2012, 8 pages.

Modeling web sources for information integration, Craig A. Knoblock, Steven Minton, Jose Luis Ambite, Naveen Ashish, Pragnesh Jay Modi, Ion Muslea, Andrew G. Philpot, and Sheila Tejada. In Proceedings of the Fifteenth National Conference on Artificial Intelligence, Madison, WI, 1998. Jul. 26-30, 1998.

Mohammed et al. A Multi-layer of Multi Factors Authentication Model for Online Banking Services, Oct. 15, 2013, 2013 International Conference on Computing, Electrical and Electronic Engineering (ICCEEE), pp. 220-224.

Neville, S.W. et al. Efficiently Archieving Full Three-Way Non-repudiation in Consumer-level eCommerce and M-Commerce Transactions, Nov. 1, 2011, 2011 IEEE 10th International Conference on Trust, Security and Privacy in Computing and Communications, pp. 664-672.

Optimizing Information Agents by Selectively Materializing Data, Naveen Ashish, Craig A. Knoblock, and Cyrus Shahabi. In Proceedings of the AAAI'98 Workshop on AI and Information Integration, Madison, WI, 1998. Jul. 26-30, 1998.

O'Riain et al., "XBRL and open data for global financial ecosystems: A linked data approach." International Journal of Accounting Information Systems 13.2 (2012): 141-162.

Quwaider et al., "Experimental Framework for Mobile Cloud Computing System", Jordan University of Science and Technology, Procedia Computer Science 52, 2015, pp. 1147-1152.

Semi-automatic wrapper generation for Internet information sources, Naveen Ashish and Craig A. Knoblock. In Proceedings of the Second IFCIS International Conference on Cooperative Information Systems, Kiawah Island, SC, 1997. Jun. 24-27, 1997.

Sunwoo et al., "A Structured Approach to the Simulation, Analysis and Characterization of Smartphone Applications", IEEE 2013, pp. 113-122.

The ariadne approach to web-based information integration, Craig A. Knoblock and Steven Minton. IEEE Intelligent Systems, 13(5), Sep./Oct. 1998.

Wrapper generation for semi-structured Internet sources, Naveen Ashish and Craig A. Knoblock. In Proceedings of the Workshop on Management of Semistructured Data, Tucson, AZ, 1997. May 13-15, 1997.

Wrapper induction for semistructured, web-based information sources, Ion Muslea, Steven Minton, and Craig A. Knoblock. In Proceedings of the Conference on Automated Learning and Discovery Workshop on Learning from Text and the Web, Pittsburgh, PA, 1998. Jun. 11-13, 1998.

(56) References Cited

OTHER PUBLICATIONS

International Search Report in PCT Application No. PCT/US2016/050536, dated Dec. 15, 2016.
Supplementary European Search Report in EP Application No. 16844973.4, dated Jan. 4, 2019.
Examination Report in CA Application No. 2997115, dated Jun. 20, 2019.
Examination Report in CA Application No. 2997115, dated Nov. 13, 2019.
Examination Report in CA Application No. 2997115 dated Apr. 2, 2020.
Examination Report in CA Application No. 2997115 dated Nov. 2, 2020, 3 pages.
Examination Report in EP Application No. 16844973.4 dated Nov. 4, 2020, 6 pages.
U.S. Appl. No. 17/302,630, filed May 7, 2021, System and Method for Programmatically Accessing Financial Data.
U.S. Appl. No. 16/800,543, filed Feb. 25, 2020, System and Method for Facilitating Programmatic Verification of Transactions.
U.S. Appl. No. 17/303,432, filed May 28, 2021, Secure Permissioning of Access to User Accounts, Including Secure Deauthorization of Access to User Accounts.
U.S. Appl. No. 17/126,673, filed Dec. 18, 2020, Secure Permission of Access to User Accounts, Including Secure Deauthorization of Access to User Accounts.
U.S. Appl. No. 16/900,052, filed Jun. 12, 2020, Parameter-Based Computer Evaluation of User Accounts Based on User Account Data Stored in One or More Databases.
U.S. Appl. No. 17/230,835, filed Apr. 14, 2021, Systems and Methods for Estimating Past and Prospective Attribute Values Associated With a User Account.
U.S. Appl. No. 16/570,630, filed Sep. 13, 2019, Secure Authorization of Access to User Accounts by One or More Authorization Mechanisms.
U.S. Appl. No. 17/103,267, filed Nov. 24, 2020, Data Verified Deposits.
U.S. Appl. No. 17/302,499, filed May 4, 2021, Secure Updating of Allocations to User Accounts.
Chaulagain et al., "Cloud Based Web Scraping for Big Data Application." IEEE International Conference on Smart Cloud, 2017, pp. 138-143.
M. C. McChesney, "Banking in cyberspace: an investment in itself," IEEE Spectrum, vol. 34, No. 2, Feb. 1997, pp. 54-59.
Examination Report in AU Application No. 2016321166 dated Dec. 7, 2020, 5 pages.
International Search Report and Written Opinion in PCT Application No. PCT/US2021/030808, dated Jun. 21, 2021, 11 pages.
Devlin, J. et al., "BERT: Pre-training of Deep Bidirectional Transformers for Language Understanding," arXive, May 24, 2019, retrieved from the internet, URL: https://arxiv.org/pdf/1810.04805.pdf, 16 pages.
Jin, C., "How Plaid parses transaction data," Oct. 22, 2020, retrieved from the internet, URL: https://plaid.com/blog/how-plaid-parsestransaction-data/, 10 pages.
International Search Report and Written Opinion in PCT Application No. PCT/US2021/071851, dated Dec. 13, 2021, 10 pages.
U.S. Appl. No. 17/499,696, Systems and Methods for Data Parsing, filed Oct. 12, 2021, .
Examination Report in CA Application No. 3119897 dated Jul. 30, 2021, 6 pages.

\* cited by examiner

BROWSER-BASED AGGREGATION

PRIORITY CLAIM

This application claims priority to U.S. Patent Application No. 62/535,859, filed Jul. 22, 2017 and titled, "BROWSER-BASED AGGREGATION," the contents of which is incorporated by reference in its entirety.

BACKGROUND

Users with multiple financial institution accounts, such as traditional banking, investments, retirement accounts, and the like, may desire a consolidated balance display from a single source, as opposed to logging in to multiple financial institution sites where they retrieve balance information individually. The difficulty inherent in multiple logins is compounded when the user has a need to check those sources frequently.

Aside from separate logins, traditional methods for monitoring balances and transactions across multiple accounts, all in one place, may require a customer to share sensitive account information in order to permit a third party to aggregate data from each financial institution where an account is held. The customer's login credentials, including user name, password, and perhaps other details such as answers to security questions, may be stored by the third party in order to retrieve related account data from each financial institution.

As an example, a user seeking to aggregate financial institution ("FI") data through a single third-party source may be required to first submit their online login credentials for each institution to the provider, using a web form or API. The third-party provider may then store the login credentials on its own servers—outside the direct control of the user—and use those stored credentials to log in on the user's behalf when a data update is scheduled or requested by the user.

Many users are reluctant to share login credentials for third-party storage outside their control, raising concerns about the security and integrity of their FI account(s). Many users are further concerned about ceding control to a third-party institution and granting the right to log in without limitation.

The desire for aggregated information from multiple sources is not limited to financial data and similarly applies to any data source that requires user login credentials.

Accordingly, there is a need for an alternate method of aggregating data that does not require a customer to share sensitive account information with a third party.

There is a further need for a data aggregation system in which login credentials are stored with the user or under the user's control.

There is a further need for a data aggregation system in which the user has control over the frequency and nature of logins to his or her accounts held with financial institutions.

BRIEF DESCRIPTION OF THE DRAWINGS

The features and advantages of the present disclosure will be more fully understood with reference to the following detailed description when taken in conjunction with the accompanying figures, wherein.

SUMMARY

Figure 1:
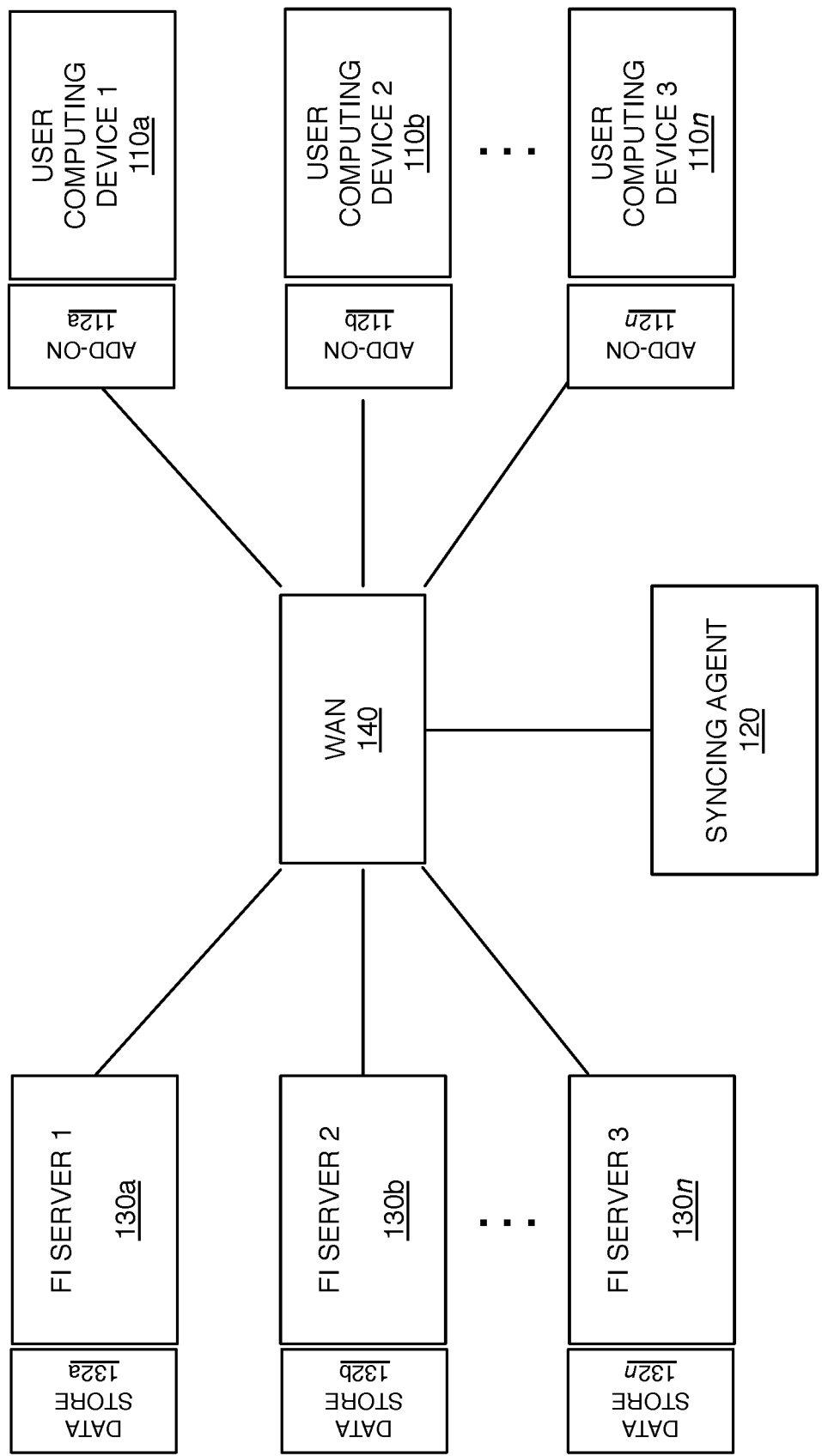
FIG. 1 is a logical block diagram describing a preferred embodiment of the present invention.

A method is disclosed in which a determination is made whether a user has logged into an information system, via user computing device comprising a system add-on to identify a live session initiated by the customer. In embodiments, the method further comprises receiving, via the add-on, session information transmitted back from the information system, wherein the plugin is configured to copy the session information, and then activate a syncing agent to receive information from the information system, wherein the syncing agent uses session information from the plugin to impersonate the live session initiated by the customer via the browser or mobile application on the user device, and wherein the syncing agent gathers data from the information system relating to at least one of the customer's accounts. In embodiments, data gathered from the information system may be stored for later retrieval by the customer or a third party.

In embodiments of the invention, a non-transitory computer readable medium is provided, having stored thereon, computer executable instructions that, if executed by a computing device, cause the computing device to perform a method comprising determining whether a user has logged into an information system, via user computing device comprising a system add-on to identify a live session initiated by the customer. In embodiments, the computer-executable method further comprises receiving, via the add-on, session information transmitted back from the information system, wherein the plugin is configured to copy the session information, and then activate a syncing agent to receive information from the information system, wherein the syncing agent uses session information to impersonate the live session initiated by the customer via the browser or mobile application on the user device, and wherein the syncing agent gathers data from the information system relating to at least one of the customer's accounts. In embodiments, data gathered from the information system may be stored for later retrieval by the customer or a third party.

In embodiments of the invention, at least one user computing device is provided comprising a processor, memory, and storage, configured to (a) determine whether a user has logged into an information system, and comprising a system add-on to identify a live session initiated by the customer; (b) receive, via the add-on, session information transmitted back from the information system. In embodiments of the invention, a server computer device is provided comprising a syncing agent configured to receive information from the information system, wherein the syncing agent uses session information to impersonate the live session initiated by the customer via the browser or mobile application on the user device, and wherein the syncing agent gathers data from the information system relating to at least one of the customer's accounts. In embodiments, a cloud storage device is provided for storing data gathered from the information system for later retrieval by the customer or a third party.

In embodiments of the invention, the information system may be a financial institution system.

In embodiments of the system, the user computing device may be a tablet computing device or mobile computing device, and may comprise a dedicated application for interacting with the syncing agent.

In embodiments of the invention, the system add-on can be selectively disabled.

In embodiments of the invention the syncing agent comprises a server computing device.

DETAILED DESCRIPTION

The present invention is directed at a system and method for aggregating account data, and more specifically, a system and method for aggregation of financial account data that provides enhanced privacy and security protections to a user by enabling the user to maintain sole custody of his or her login credentials.

In embodiments of the present invention, a system is provided in which user data—including financial data sourced from financial institutions—may be aggregated to present a consolidated interface, without the user being required to share sensitive account information, or permitting the aggregator to store sensitive account information. In embodiments of the invention, user credentials needed to log into an account are maintained solely with the customer and are not shared through their personal device.

System Elements

FIG. 1 is a logical block diagram describing a preferred embodiment of the present invention. One or more user computing devices 110a . . . 110n may be in communication with a syncing agent 120 via a wide-area network 140 such as the Internet. A plurality of financial institution web sites 130a . . . 130n may be each associated with a financial institution data store 132a . . . 132n via a network link such as a local area network. Financial institution web sites 130a . . . 130n may similarly be in communication with the syncing agent 120 via a wide-area network such as the Internet.

Each of user computing devices 110a . . . 110n may be associated with system add-ons 112a . . . 112n that, in a preferred embodiment, may be a plug-in that functions as a bridge between the syncing agent 120 and financial institutions 130a . . . 130n. System add-ons 112a . . . 112n may be integrated with computing devices 110a . . . 110n, such as a browser plug-in, API, or special-purpose application, or be physically or logically separate from the computing devices.

FIG. 1 illustrates just one example of a logical framework that may be used, and those of skill in the art will appreciate that the specific implementation is secondary to the functionality that the system components provide.

Process Flow

Figure 2:
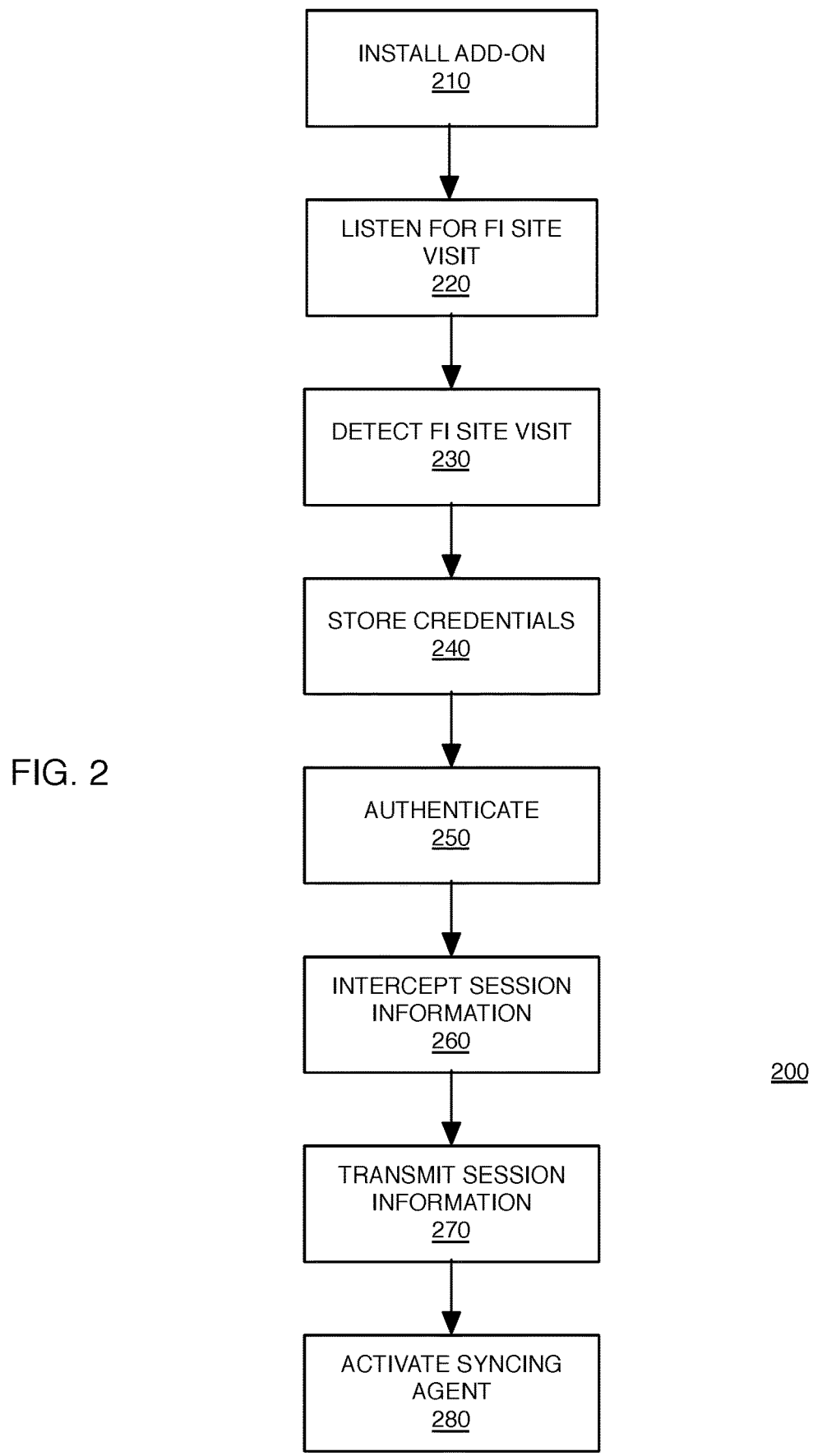
FIG. 2 is a process diagram describing the steps in an exemplary embodiment of the present invention.

Referring to FIG. 2, a process diagram is shown describing the steps in an exemplary embodiment of the present invention.

In a preferred embodiment, a system add-ons such as a browser plugin is first provided (210) to a user computing device to facilitate exchange with the syncing agent described herein. In embodiments, the browser plugin may be enabled or disabled by the user to meet the user's individual privacy requirements. In an alternate embodiment, a mobile application including necessary plugin code may be opened on the customer device and run in the foreground as would any other app on the device.

When enabled, the plugin is set to a "listening" mode (220) and configured to detect navigation by a user to a FI website. In embodiments, FI websites may include, for example, banking, investment, and retirement accounts, though the system is equally applicable to non-FI information. When the user has navigated to a FI website (230), the user may be prompted to log on as provided by the FI website, and the plugin may coordinate the storage of the user's login credentials (240) on the local user computing device. In embodiments, the plugin may be configured to store login credentials to be entered automatically on the FI website (similar to a password manager browser plugin), but in a preferred embodiment login credentials are not stored so that sensitive personal information associated with an account is maintained solely with the customer, or on the customer's device.

The user's login credentials may then be transmitted to the FI server using the conventional method, wherein the FI authenticates the credentials (250) and sends back a cookie or other session information, which is intercepted (260) by the plugin and saved for later use.

With the cookie or session information in hand following the user's standard login process, the plugin may copy the session information and transmit it to the syncing agent (280) and/or to cloud storage (270) to be stored in a database.

In embodiments, a syncing agent is then activated (280) to receive information from the FI. In embodiments, the syncing agent may route its communications with the FI through the plugin, which then adds the live session information to those communications in order to use the session established by the user. In other embodiments, the syncing agent may be configured to retrieve cookie or session information from the plugin or database and communicate with the FI directly, to operate as an agent of the user logged in to the current session on the user device.

Figure 3:
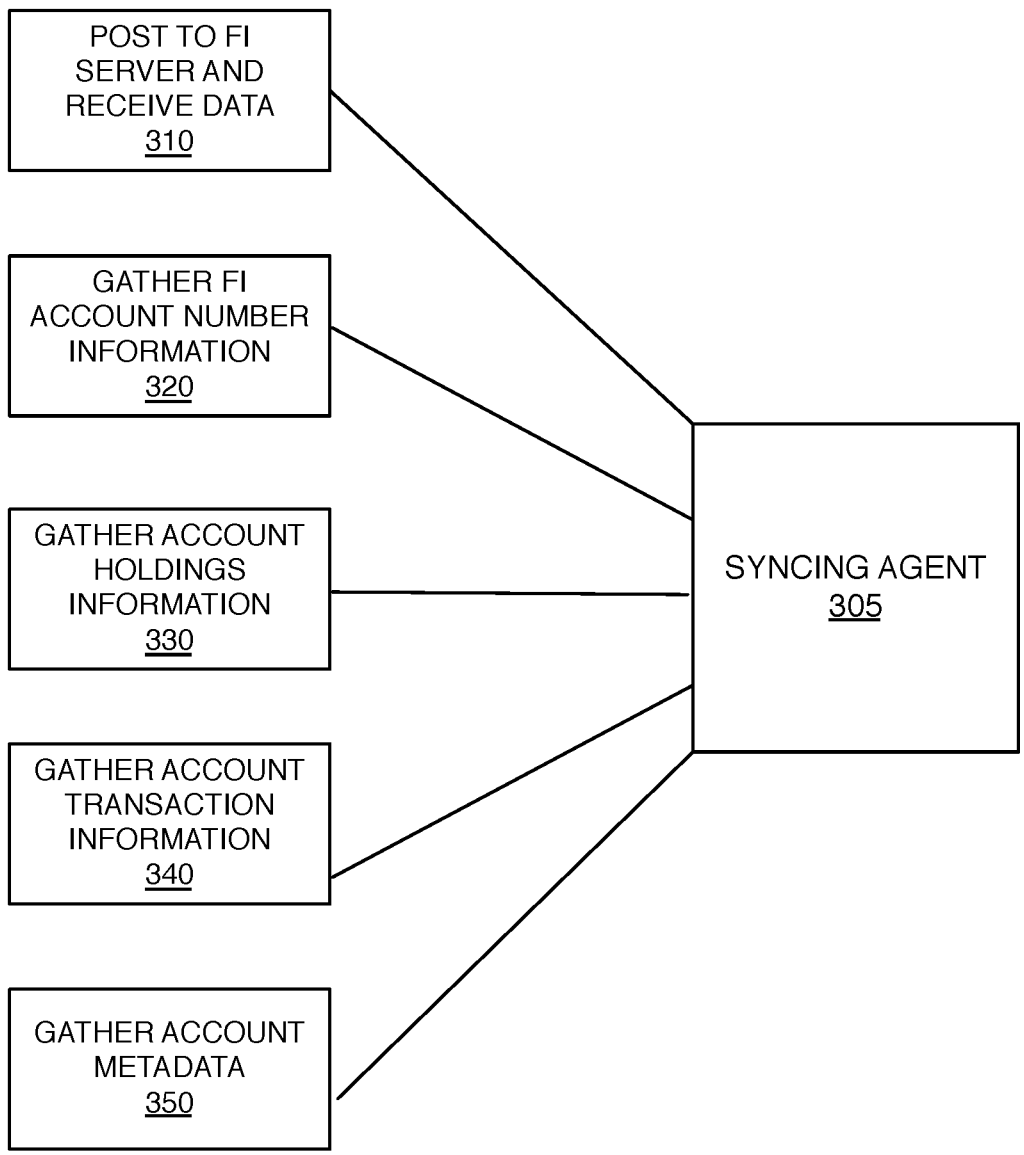
FIG. 3 is a block diagram illustrating exemplary functions of a syncing agent according to embodiments of the present invention.

FIG. 3 contains a block diagram illustrating exemplary functions of the syncing agent after the user is logged in to the FI website and syncing agent is in possession of a valid cookie or session information.

In embodiments, the activated syncing agent 305 may:

(a) route communications through the plugin, or make direct posts to the FI web server, using session information, and the FI may send data back to the syncing agent (either via the plugin or directly, thinking that the syncing agent is the browser or mobile app accessing the live session on the user device) (310);

(b) gather data related to account information (account number, account type, etc.) (320);

(c) gather data related to account information holdings/positions/balance information (330);

(d) gather data related to account information transaction history information (340); and (e) gather data related to account information account "metadata" (bill payment due date, APR, etc.) (350).

The syncing agent may gather data so long as the user remains logged in to a valid session with the FI. Data retrieved by the syncing agent will reside in the cloud database and may be retrieved later on by the user or a third party.

It will be appreciated that the foregoing is merely a summary of all available functions that could be implemented when the syncing agent may use valid cookie or session login information.

System Architecture

Figure 4:
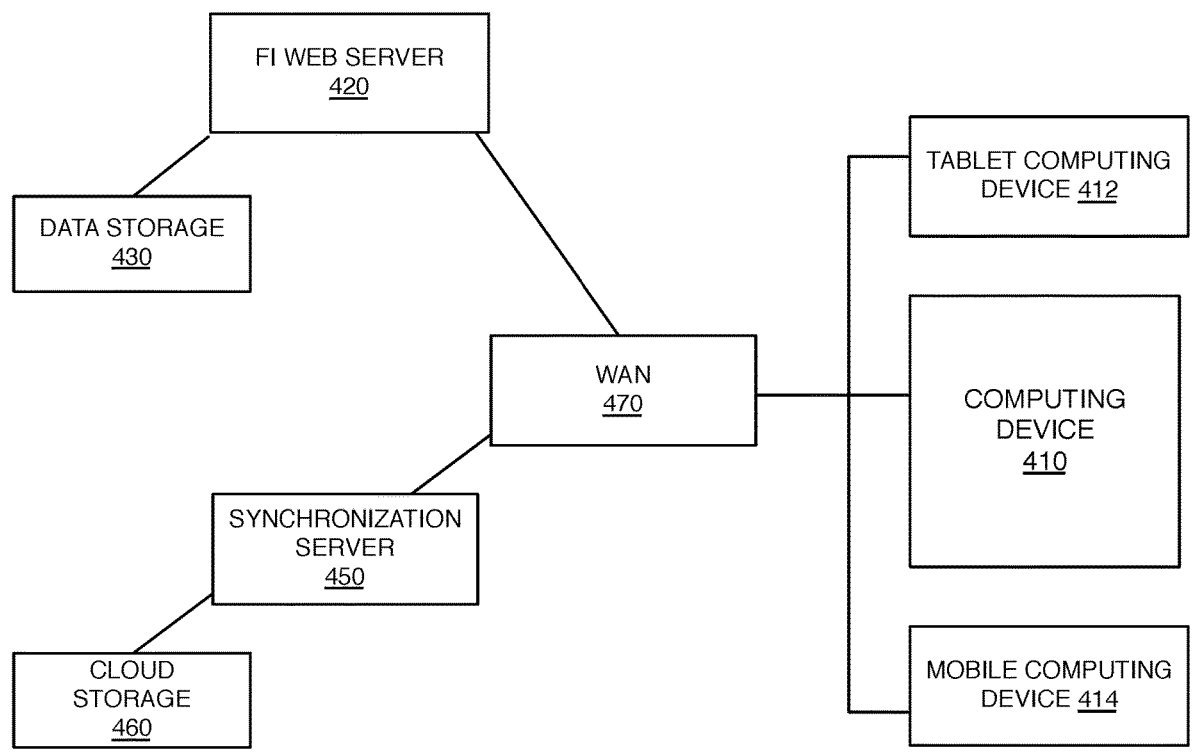
FIG. 4 describes an exemplary system architecture that may be used to implement one or more illustrative aspects of the present invention.

FIG. 4 describes an exemplary system architecture that may be used to implement one or more illustrative aspects described herein. Computer software, hardware, and networks may be utilized in a variety of different system environments, including standalone, networked, remote-access, virtualized, and/or cloud-based environments, among others.

In embodiments, a user may engage with the system via one or more user computing devices connected to the network. Referring to FIG. 4, exemplary computing devices may include personal computer 410. In embodiments other computing devices may be utilized—alternatively or in convert—including tablet computer 412, mobile device 414, and similar devices.

In embodiments, computing device 410 may be a personal computer, a server, a network router, switch or bridge, virtual assistant (e.g., Amazon Alexa, Google Home, Apple HomePod), digital media player (e.g., Amazon Fire, AppleTV, Roku, Google Chromecast, Roku), smartwatch, a set-top box (STB), gaming system, or any machine capable of executing a set of instructions (sequential or otherwise) that specify actions to be taken by that computing device.

While only a collection of computing devices are illustrated, the term "computing device" should be taken to include any collection of computing devices that individually or jointly execute a set (or multiple sets) of instructions to perform any one or more of the methodologies discussed herein.

In embodiments, the computing device may be connected (e.g., networked) to other machines in a LAN, an intranet, an extranet, a WiFi network, a cellular network, or the Internet (WAN) 470. In embodiments, computing device 410 may be provided with a web browser for facilitating connections over the network.

In embodiments of the present invention, a browser plugin may be provided on computing device 410 to carry out the steps described in FIGS. 2-3. The term "plugin" refers to any software component that extends the functionality of the user's existing system, and may include browser plugins, extensions, system services, and other software- and hardware-based add-ons.

In further embodiments, computing device 410 may be provided with an app that implements the methodologies discussed herein. In embodiments of the invention, a software development kit ("SDK") may be provided to facilitate development of mobile apps (or other software) to run operate with the system of the present invention.

In embodiments, the system of the present invention may include one or more web servers 420, each connected to a financial information database or data storage device 430. In embodiments, the computing device may be connected (e.g., networked) to other machines in the same manner as the computing device 410, namely, in a LAN, an intranet, an extranet, a WiFi network, a cellular network, or the Internet.

In embodiments, the system of the present invention may include a synchronization server 450 and associated cloud storage 460. The synchronization server 450 may contain code that implements the synchronization steps shown in FIGS. 2-3 and discussed herein. Cloud storage 460 may be a data storage device, which can be configured as a server computing service, for receiving user data during synchronization. Synchronization server 460 may function as an intermediary system between a user and financial institution, and coordinate the steps of accessing, storing, and processing user FI data.

As shown in FIG. 4, various nodes including those associated with a network—including 410, 420, 430, 440—may be interconnected using a wide area network (WAN) 470, such as the Internet. Other networks may also or alternatively be used, including private intranets, corporate networks, LANs, metropolitan area networks (MAN) wireless networks, personal networks (PAN), and the like. Network 470 is for illustration purposes and may be replaced with fewer or additional computer networks. A local area network (LAN) may have one or more of any known LAN topology and may use one or more of a variety of different protocols, such as Ethernet. Devices—including 410, 420, 430, 440—may be connected to one or more of the networks via ethernet cable, coaxial cable, fiber optic cable, wireless communication protocols utilizing radio waves (including, e.g., WiFi and Bluetooth), or other communication media.

It will be understood that the term "network" refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

It will be understood by those of ordinary skill in the art that computing devices, server computing devices, and data storage may be combined on the same physical machines, and retain separate virtual or logical addresses, or may reside on separate physical machines. FIG. 4 illustrates just one example of a network architecture that may be used, and those of skill in the art will appreciate that the specific network architecture and data processing devices used may vary, and are secondary to the functionality that they provide, as further described herein. For example, services provided by web server 420 and data server 430 may be combined on a single server.

Each component node on the network—including computing devices 410, 412, 414 and server computing devices 420, 450—may be any type of known computer, server, or data processing device. User computing devices and servers may include a processor controlling overall operation of the computing device or server. These devices may further include random access memory (RAM), read-only memory (ROM), network interface, input/output interfaces (e.g., keyboard, touchscreen, mouse, display, printer, etc.), and memory.

Memory may also store data used in performance of one or more aspects described herein, including the databases associated with the servers discussed herein. Information can be stored in a single database, or separated into different logical, virtual, or physical databases, depending on system design. Those of skill in the art will appreciate that the functionality of user computing devices and servers described herein may be spread across multiple data processing devices, for example, to distribute processing load across multiple computers, to segregate transactions based on geographic location, user access level, quality of service, or other factors.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting or markup language. The computer executable instructions may be stored on a computer-readable medium such as a nonvolatile storage device. Any suitable computer-readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Although the foregoing invention has been described in detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method comprising:
    executing a system add-on on a user computing device, wherein the system add-on is configured to:
        detect navigation, by a user and using a browser or mobile application of the user computing device, to an institution web site provided by an institution server of an institution;
        transmit user login credentials from the user computing device and to the institution server to authenticate the user with the institution server;
        upon (1) establishing a live session between the browser or mobile application of the user computing device and the institution server based on successful authentication of user login credentials, and (2) receiving, from the institution server, session information that establishes the live session, wherein the session information comprises a browser cookie:
        intercept the session information on the user computing device, wherein the session information is different from the login credentials, and wherein the live session comprises a currently occurring session between the user computing device and the institution server;
        transmit the intercepted session information from the user computing device and to a syncing agent, wherein the syncing agent comprises a server computing device, wherein the server computing device, the user computing device, and the institution server are three separate devices; and
        maintain control of the user login credentials to prevent the user login credentials from being transmitted from the user computing device to the syncing agent to prevent the syncing agent from accessing the user login credentials; and
    executing the syncing agent on the server computing device, wherein the syncing agent on the server computing device is configured to:
        receive the session information from the system add-on executing on the user computing device;
        use the session information to establish communication with the institution server to operate as an agent of the user during the live session, thereby causing the institution server to transmit data to the syncing agent as if the syncing agent is the browser or mobile application executing the live session on the user computing device, to allow the syncing agent to function as an intermediary between the user and the institution server;
        only during the live session and prior to termination of the live session, gather account data transmitted from the institution server via the network and using the session information, wherein the account data relates to at least one account of a customer of the institution, and wherein the account data is different from the user login credentials and the session information;
        store the account data gathered from the institution server and during the live session to allow the syncing agent, during the live session and after termination of the live session, to access the account data gathered during the live session;
        store second account data gathered from an institution server of a second institution and during a second live session, wherein the second account data gathered during the second live session relates to at least one account of the customer of the second institution;
        provide the account data gathered from the institution server and during the live session to the user computing device to allow the user to access the account data without communicating with the institution server; and
        provide the second account data gathered from the institution server of the second institution and during the second live session to allow the user to access the second account data without communicating with the institution server of the second institution.

2. The method of claim 1, wherein the system add-on may be selectively disabled by the user of the user computing device.

3. A system comprising:
    a user computing device comprising a processor, memory, and storage, wherein the user computing device is configured to execute a system add-on, and wherein the system add-on is configured to:
        detect navigation, by a user and using a browser or mobile application of the user computing device, to an institution web site provided by an institution server of an institution;
        transmit user login credentials from the user computing device and to the institution server to authenticate the user with the institution server;
        upon (1) establishing a live session between the browser or mobile application of the user computing device and the institution server based on successful authentication of user login credentials, and (2) receiving, from the institution server, session information that establishes the live session, wherein the session information comprises a browser cookie:
        intercept the session information on the user computing device, wherein the session information is different from the login credentials, and wherein the live session comprises a currently occurring session between the user computing device and the institution server;

transmit the intercepted session information from the user computing device and to a syncing agent, wherein the syncing agent comprises a server computing device, wherein the server computing device, the user computing device, and the institution server are three separate devices; and maintain control of the user login credentials to prevent the user login credentials from being transmitted from the user computing device to the syncing agent to prevent the syncing agent from accessing the user login credentials; and executing the syncing agent on the server computing device, wherein the syncing agent on the server computing device is configured to:

receive the session information from the system add-on executing on the user computing device;

use the session information to establish communication with the institution server to operate as an agent of the user during the live session, thereby causing the institution server to transmit data to the syncing agent as if the syncing agent is the browser or mobile application executing the live session on the user computing device, to allow the syncing agent to function as an intermediary between the user and the institution server;

only during the live session and prior to termination of the live session, gather account data transmitted from the institution server via the network and using the session information, wherein the account data relates to at least one account of a customer of the institution, and wherein the account data is different from the user login credentials and the session information;

store the account data gathered from the institution server and during the live session to allow the syncing agent, during the live session and after termination of the live session, to access the account data gathered during the live session;

store second account data gathered from an institution server of a second institution and during a second live session, wherein the second account data gathered during the second live session relates to at least one account of the customer of the second institution;

provide the account data gathered from the institution server and during the live session to the user computing device to allow the user to access the account data without communicating with the institution server; and provide the second account data gathered from the institution server of the second institution and during the second live session to allow the user to access the second account data without communicating with the institution server of the second institution.

4. The system of claim 3, wherein the system add-on may be selectively disabled by the user of the user computing device.

5. A non-transitory computer-readable storage medium having stored thereon computer executable instructions that, when executed by a computing device, cause the computing device to perform a method comprising:

executing a system add-on on a user computing device, wherein the system add-on is configured to:

detect navigation, by a user and using a browser or mobile application of the user computing device, to an institution web site provided by an institution server of an institution;

transmit user login credentials from the user computing device and to the institution server to authenticate the user with the institution server;

upon (1) establishing a live session between the browser or mobile application of the user computing device and the institution server based on successful authentication of user login credentials, and (2) receiving, from the institution server, session information that establishes the live session, wherein the session information comprises a browser cookie:

intercept the session information on the user computing device, wherein the session information is different from the login credentials, and wherein the live session comprises a currently occurring session between the user computing device and the institution server;

transmit the intercepted session information from the user computing device and to a syncing agent, wherein the syncing agent comprises a server computing device, wherein the server computing device, the user computing device, and the institution server are three separate devices; and maintain control of the user login credentials to prevent the user login credentials from being transmitted from the user computing device to the syncing agent to prevent the syncing agent from accessing the user login credentials; and executing the syncing agent on the server computing device, wherein the syncing agent on the server computing device is configured to:

receive the session information from the system add-on executing on the user computing device;

use the session information to establish communication with the institution server to operate as an agent of the user during the live session, thereby causing the institution server to transmit data to the syncing agent as if the syncing agent is the browser or mobile application executing the live session on the user computing device, to allow the syncing agent to function as an intermediary between the user and the institution server;

only during the live session and prior to termination of the live session, gather account data transmitted from the institution server via the network and using the session information, wherein the account data relates to at least one account of a customer of the institution, and wherein the account data is different from the user login credentials and the session information;

store the account data gathered from the institution server and during the live session to allow the syncing agent, during the live session and after termination of the live session, to access the account data gathered during the live session;

store second account data gathered from an institution server of a second institution and during a second live session, wherein the second account data gathered during the second live session relates to at least one account of the customer of the second institution;

provide the account data gathered from the institution server and during the live session to the user computing device to allow the user to access the account data without communicating with the institution server; and provide the second account data gathered from the institution server of the second institution and during the second live session to allow the user to access the second account data without communicating with the institution server of the second institution.

6. The non-transitory computer-readable storage medium of claim 5, wherein the system add-on may be selectively disabled by the user of the user computing device.

\* \* \* \* \*